United States Patent
Sahu et al.

(10) Patent No.: US 12,475,178 B2
(45) Date of Patent: Nov. 18, 2025

(54) GENERATING NARRATIVE QUERY RESPONSES UTILIZING GENERATIVE LANGUAGE MODELS FROM SEARCH-BASED AUTOSUGGEST QUERIES

(71) Applicant: Microsoft Technology Licensing, LLC, Redmond, WA (US)

(72) Inventors: Tezan Sahu, Hyderabad (IN); Kishor Chamua, Hyderabad (IN); Anuska Nandy, Hyderabad (IN); Deepanjali Singh, Uttar Pradesh (IN); Manish Gupta, Hyderabad (IN)

(73) Assignee: Microsoft Technology Licensing, LLC, Redmond, WA (US)

(*) Notice: Subject to any disclaimer, the term of this patent is extended or adjusted under 35 U.S.C. 154(b) by 344 days.

(21) Appl. No.: 18/208,638

(22) Filed: Jun. 12, 2023

(65) Prior Publication Data
US 2024/0411824 A1    Dec. 12, 2024

(51) Int. Cl.
G06F 16/9532    (2019.01)
G06F 40/274    (2020.01)
G06F 40/40    (2020.01)

(52) U.S. Cl.
CPC ........ G06F 16/9532 (2019.01); G06F 40/274 (2020.01); G06F 40/40 (2020.01)

(58) Field of Classification Search
CPC .... G06F 16/9532; G06F 40/274; G06F 40/40; G06F 3/0482; G06F 3/04895; G06N 3/045; G06N 3/0455
See application file for complete search history.

(56) References Cited

U.S. PATENT DOCUMENTS 10,102,199 B2 * 10/2018 Bailey .................. G06F 40/289
2013/0046777 A1 * 2/2013 Mohiuddin ......... G06F 16/3325
                                                              707/767
(Continued)

FOREIGN PATENT DOCUMENTS

KR    20220107737 A    8/2022

OTHER PUBLICATIONS

International Search Report and Written Opinion received for PCT Application No. PCT/US2024/031333, mailed on Oct. 10, 2024, 15 pages.

*Primary Examiner* — Jared M Bibbee
(74) *Attorney, Agent, or Firm* — Ray Quinney & Nebeker P.C.; Christopher K. Hallstrom

(57) ABSTRACT

This disclosure describes a query gateway system that provides an efficient and flexible framework for providing context-retained autosuggest queries from an autosuggest query system (e.g., a search engine query experience) to a generative language model system (e.g., an AI chat experience). For instance, the query gateway system establishes a framework to leverage the features and services of the autosuggest query system and automatically provides context-retained queries to the generative language model system using separate user interfaces that do not disrupt user navigation or require manual duplicative user input. Additionally, the query gateway system incorporates additional enhancements, including an AI chat eligibility model and a query reformulation model, to improve the computational efficiency and accuracy of the AI chat system.

20 Claims, 11 Drawing Sheets

(56) References Cited

U.S. PATENT DOCUMENTS

| | | | |
|---|---|---|---|
| 2015/0325237 A1* | 11/2015 | Chang | G10L 15/34 |
| | | | 704/257 |
| 2020/0159856 A1* | 5/2020 | Mital | G06F 16/9038 |
| 2023/0101701 A1* | 3/2023 | Mac an tSaoir | G06F 40/274 |
| | | | 704/9 |
| 2023/0140702 A1* | 5/2023 | Bodigutla | G06F 18/2185 |
| | | | 706/12 |
| 2023/0290338 A1* | 9/2023 | Robert Jose et al. | |
| | | | G10L 15/142 |

\* cited by examiner

GENERATING NARRATIVE QUERY RESPONSES UTILIZING GENERATIVE LANGUAGE MODELS FROM SEARCH-BASED AUTOSUGGEST QUERIES

BACKGROUND

Search engine services have significantly enhanced the ability to explore websites across the vast expanse of the Internet. More recently, advanced chat services utilizing artificial intelligence (AI), known as generative language models (GLMs), including large language models (LLMs), have emerged. These GLMs employ machine-learning models to generate narrative-based responses based on user inquiries. While these services typically operate independently, certain service providers have started incorporating links between them. However, there still lacks a framework for integrating context-retention between services. Moreover, although certain features can enhance one service, there is currently no mechanism in place to leverage these advancements to improve the other service.

BRIEF DESCRIPTION OF THE DRAWINGS

The following detailed description provides specific and detailed implementations accompanied by drawings. Additionally, each of the figures listed below corresponds to one or more implementations discussed in this disclosure.

DETAILED DESCRIPTION

Figure 1:
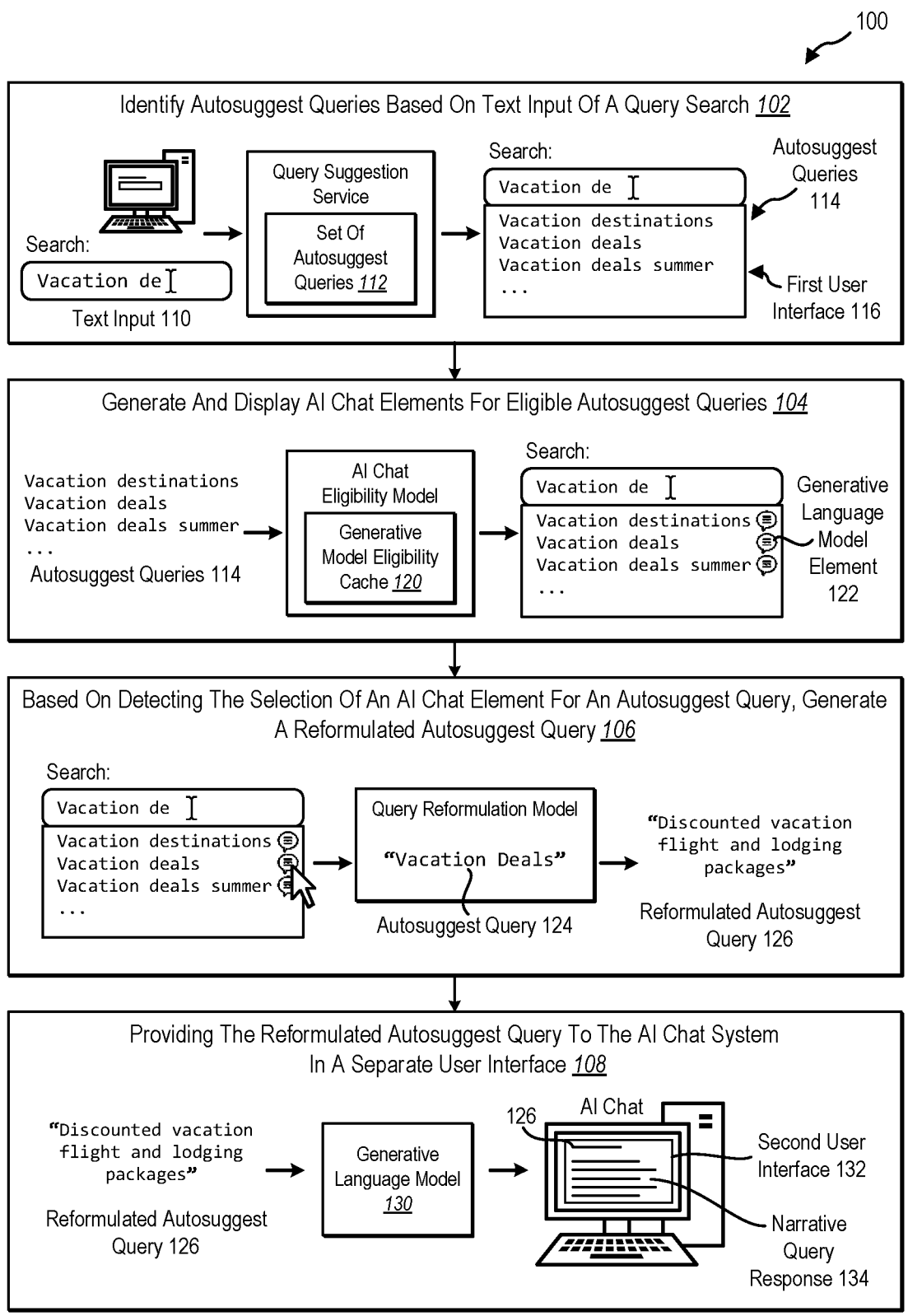
FIG. 1 illustrates an overview example of implementing a query gateway system that facilitates context-retained autosuggest queries from an autosuggest query system to a generative language model system.

The present disclosure describes a query gateway system that provides an efficient and flexible framework for providing context-retained autosuggest queries from an autosuggest query system to a generative language model system. In particular, the query gateway system establishes a framework to leverage the features and services of the autosuggest query system, including relevant autosuggest queries, to enhance the queries provided to the generative language model system. Additionally, the query gateway system incorporates additional enhancements, such as an AI chat eligibility model and a query reformulation model, to improve the computational efficiency and accuracy of the AI chat system.

In some implementations, the query gateway system combines the autosuggest feature of web-based search experiences with AI chat-based experiences. For instance, the query gateway system selectively generates and provides additional graphical elements within the autosuggest query interface (e.g., web-based search experiences) to initiate a transition to the generative language model system interface (e.g., AI chat-based experiences). Additionally, when transitioning between search and chat experiences, the query gateway system facilitates retaining contexts of autosuggest queries and, in many cases, provides additional context to a query provided to the AI chat system. Further, the query gateway system provides a flexible framework that minimizes navigational disruptions during the transition between search systems.

To elaborate, in some implementations, the query gateway system utilizes generative language models to generate narrative query responses, such as AI chat responses. For instance, when text input (e.g., a text prefix) corresponding to a search query (e.g., a web search) is detected, the query gateway system identifies one or more autosuggest queries. Additionally, in some instances, the query gateway system generates a generative language model (GLM) eligibility cache of autosuggest queries. Then, based on the determination that the autosuggest query is eligible for a generative language model (e.g., the AI chat model) using the generative language model eligibility cache, the query gateway system provides a generative language model element for display next to the autosuggest query within a first user interface. Upon detecting the selection of the generative language model element, the query gateway system generates a reformulated autosuggest query from the original autosuggest query. Further, the query gateway system provides the reformulated autosuggest query to the generative language model for display in a second user interface that is separate from the first user interface.

As described in this document, the query gateway system delivers several significant technical benefits in terms of computing efficiency, accuracy, and flexibility compared to existing systems. Moreover, the query gateway system provides several practical applications that address problems by presenting a framework that retains the context of one or more autosuggest queries from an autosuggest query system within a query, often reformulated, presented to a generative language model system, resulting in several benefits as further demonstrated below.

To illustrate, the query gateway system adds an AI chat element (i.e., a GLM element) to the autosuggest query pane of a search user interface for each eligible autosuggest query. Then, upon the selection of an AI chat element shown next to the first autosuggest query, the query gateway system opens a separate AI chat user interface (i.e., a GLM interface) that includes a first narrative-based response from the GLM based on the first autosuggest query. Upon detecting the selection of another AI chat element shown next to a second autosuggest query (as the autosuggest queries are preserved within the search user interface even upon selection of an AI chat element), the query gateway system opens another separate AI chat user interface that includes a second narrative-based response from the GLM based on the second autosuggest query.

By including a generative language model element (e.g., the AI chat button) in a user interface that triggers a transition to the GLM system, the query gateway system provides an improved user interface that significantly reduces the number of navigational steps currently needed to switch from the autosuggest query system to the GLM system. To elaborate, while existing systems provide autosuggest queries in response to a user inputting a text prefix, these autosuggest queries only allow a user to perform a corresponding web search with a selected autosuggest query. If a user wants to switch to an AI chat-based experience, the user needs to navigate to a GLM user interface and manually re-enter the autosuggest query. Occasionally, after a traditional web search is executed, an existing system will provide an option that, when selected, will forward the autosuggest query to a GLM system for further processing. In contrast, the query gateway system enables a user to automatically transition from an autosuggest query to the GLM interface without requiring the user to manually navigate to the GLM interface or re-enter the autosuggest query.

This benefit further increases when multiple autosuggest queries are selected to be provided to the GLM system. For example, with existing systems, if a user desires to receive responses from multiple autosuggest queries from a text input prefix, the user may need to re-enter the text input prefix for each selected autosuggest query and then copy each selected autosuggest query from the autosuggest query system to the GLM system. Each time, the user needs to manually switch between each system interface, often reloading a system's user interface and re-entering the text input prefix and/or an autosuggest query. In contrast, the query gateway system allows a user to enter a text input prefix once and select AI chat elements corresponding to multiple autosuggest queries provided without needing to leave or reload the autosuggest query system interface. Further, the query gateway system allows the user to visit different instances of the GLM system corresponding to each of the selected AI chat elements, where the corresponding autosuggest queries are automatically loaded into the GLM system.

By utilizing the generative language model element with an autosuggest query, the query gateway system also improves overall accuracy by retaining the context of the autosuggest query. For example, the query gateway system automatically provides the autosuggest query to the GLM system without requiring the user to manually select, copy, and/or re-enter the autosuggest query from the autosuggest query search system to the GLM system. In this way, the query gateway system ensures that the context is accurately preserved in the transition.

Further, in cases where computing devices have smaller displays, the navigational benefits provided by the generative language model elements become even more important. For example, devices with smaller displays can be very difficult to navigate between interfaces, such as browser tabs. Adding to this a user needing to manually copy-and-paste or re-enter an autosuggest query, navigation between multiple interfaces becomes even more difficult. The query gateway system instead provides generative language model elements (e.g., AI chat elements) that a user can easily select for one or more autosuggest queries and the query gateway system automatically forwards and loads the corresponding autosuggest query to the GLM system in a new or separate interface.

Additionally, in many instances, the query gateway system provides further improved accuracy by utilizing reformulated autosuggest queries. For example, in these implementations, the query gateway system utilizes the autosuggest query to generate a new, reformulated autosuggest query that is better suited to the input parameters of the GLM system. In this way, the reformulated autosuggest query causes the GLM system to generate better, more accurate responses than an autosuggest query that is poorly suited for the GLM system.

Moreover, by utilizing a generative language model eligibility cache or a reformulation query cache, the query gateway system reduces the number of computational operations that need to occur. For example, in some implementations, when an autosuggest query is selected, the query gateway system determines if the autosuggest query is associated with a reformulated autosuggest query. If a reformulated autosuggest query exists for an autosuggest query in the generative language model eligibility cache, then the query gateway system does not need to reprocess the autosuggest query to generate a new reformulated autosuggest query. If a new reformulated autosuggest query needs to be generated, the query gateway system utilizes a lightweight language model to determine a reformulated autosuggest query in real-time. Furthermore, the query gateway system stores the newly generated reformulated autosuggest query in the generative language model eligibility cache to prevent re-generating the reformulated autosuggest query in the future.

As a further example, in some implementations, the query gateway system allows for the simultaneous selection of multiple autosuggest queries. In these implementations, the query gateway system reformulates the multiple autosuggest queries into a single robust AI chat query to provide to the GLM system. In this way, the query gateway system provides a significantly more flexible approach than current systems, which require users to manually formulate an AI chat query. Additionally, the query gateway system enables a user to receive a narrative-based response from the GLM system with fewer navigational steps. Furthermore, by generating a reformulated autosuggest query from multiple autosuggest queries, the narrative-based response generated by the GLM system is more accurate.

This disclosure uses several terms to describe the features and advantages of one or more implementations. For instance, the term "autosuggest query search system" refers to a search engine system, or another type of search system, that provides contextually relevant suggested search queries to a user, called "autosuggest queries," For example, the autosuggest query search system utilizes a text input field to detect text input corresponding to a search query. "Text input" is detected in the form of typed letters, phrases, and/or prefixes as text input is received. In response, the autosuggest query search system provides multiple autosuggest queries as input to the search query.

The term "generative language model system" (GLM system) refers to an advanced computational system that uses natural language processing and machine learning to generate coherent and contextually relevant human-like text, referred to as "narrative-based query responses" or "narrative query responses" in this document. One example of such a model is a Large Language Model (LLM), which has been trained on a vast dataset and can produce fluent, coherent, and topic-specific text. GLMs have applications in natural language understanding, content generation, text summarization, dialog systems, language translation, and creative writing assistance. In some instances, the GLM system is referred to as an AI chat system. In some instances, the GLM is referred to as an AI chat model, an AI chat service, or simply an AI chat.

In this document, a "generative language model element" (GLM element) refers to a graphical user interface element connected to an autosuggest query. In some instances, a GLM element is referred to as an AI chat element or an AI chat button. In various implementations, one or more GLM elements are displayed in a user interface of an autosuggest query search system such as an autosuggest pane that shows one or more autosuggest queries for text input. When a GLM element corrected to a given autosuggest query is selected, the query gateway system may trigger a transition to the GLM system based on the given autosuggest query, as described below.

Additional details regarding an example implementation of the query gateway system (i.e., an "autosuggest query-to-GLM gateway system") are discussed in connection with the following figures. For example, FIG. 1 illustrates an overview example of implementing a query gateway system to deliver context-retained autosuggest queries from an autosuggest query system to a generative language model system according to one or more implementations.

As shown in FIG. 1, a series of acts 100 provides an example of the query gateway system that offers a framework for delivering context-retained autosuggest queries from an autosuggest query system to a generative language model system. In various implementations, the query gateway system performs the series of acts 100. In some implementations, an autosuggest query search system and/or a generative language model (GLM) system, which coordinates with the query gateway system, performs one or more of the acts or parts of the acts.

Additionally, the series of acts 100 includes an act 102 of identifying autosuggest queries 114 based on text input 110 for a query search. For example, in response to a user providing text input 110, a query suggestion service determines autosuggest queries 114 from a set of autosuggest queries 112. In various implementations, the query suggestion service is part of an autosuggest query search system.

FIG. 1 also shows a first user interface 116 in connection with the act 102. The first user interface 116 includes a text input field to receive the text input 110 and an autosuggest pane that displays the autosuggest queries 114. In various implementations, the autosuggest query search system displays the autosuggest query search system, such as part of a search engine website or a product search user interface. Additional details regarding generating autosuggest queries from text input are provided in connection with FIG. 3 and FIG. 5.

In FIG. 1, the series of acts 100 includes an act 104 of generating and displaying AI chat elements for eligible autosuggest queries. For example, when the autosuggest queries 114 are determined for the text input 110, the query gateway system provides one or more of the autosuggest queries 114 to an AI chat eligibility model (i.e., a GLM eligibility model) with a generative language model cache 120 to determine if a given autosuggest query is eligible to be provided to the GLM system. For eligible autosuggest queries, the query gateway system generates and provides a generative language model element 122 (GLM element) (such as an AI chat element) displayed alongside the autosuggest query within the first user interface 116. Additional details regarding determining GLM eligibility are provided in connection with FIG. 5.

As shown, the series of acts 100 includes an act 106 of generating a reformulated autosuggest query upon detecting the selection of an AI chat element for an autosuggest query. For example, in response to detecting the selection of the generative language model element 122 displayed alongside a corresponding autosuggest query, the query gateway system sends the autosuggest query 124 to the GLM system for processing.

In some implementations, before providing the autosuggest query 124 to the GLM system, the query gateway system determines a reformulated autosuggest query 126 for the autosuggest query 124. For example, the query gateway system utilizes a query reformation model to identify and/or generate a reformulated autosuggest query 126 for the autosuggest query 124. Generally, a reformulated autosuggest query is comprehensive and detailed (e.g., more robust and verbose) leading to better responses from the GLM system. Additional details regarding determining GLM eligibility are provided in connection with FIG. 3, FIG. 5, and FIG. 6.

As shown, the series of acts 100 includes an act 108 of providing the reformulated autosuggest query 126 to the AI chat system in a separate user interface. For example, once the reformulated autosuggest query 126 is determined, the query gateway system delivers it to the GLM system and initiates or causes the GLM system to begin processing the reformulated autosuggest query 126 as a narrative-based query using a generative language model 130.

Additionally, as mentioned earlier, in various implementations, the query gateway system generates a new user interface, such as a second user interface 132, to accommodate the GLM system. For example, if the first user interface 116 is displayed in a first window or browser tab, the query gateway system creates or generates a new window or browser tab to show the AI chat system. This ensures that the first user interface 116 and the user's search experience remain uninterrupted when the AI chat system is triggered to provide a narrative query response 134 for the corresponding autosuggest query. Additional details regarding triggering the GLM system are provided below in connection with FIG. 3, FIGS. 4A-4B, FIG. 5, and FIGS. 7A-7B.

Figure 2:
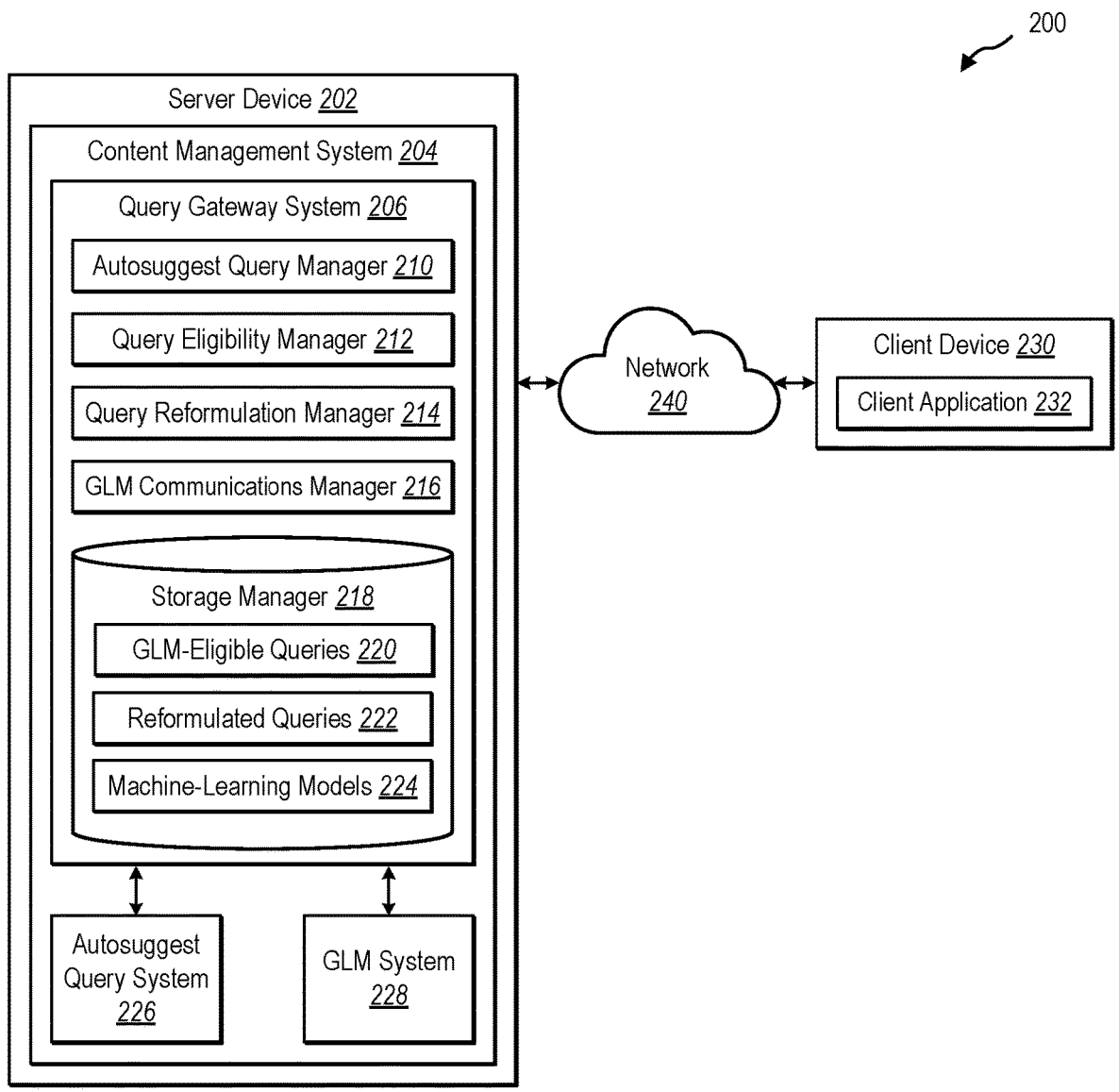
FIG. 2 illustrates a system environment where a query gateway system is implemented.

With a general overview of the query gateway system in place, additional details are provided regarding the components and elements of the query gateway system (i.e., an "autosuggest query-to-GLM gateway system"). To illustrate, FIG. 2 illustrates an example system environment where a query gateway system is implemented according to one or more implementations. While FIG. 2 shows an example arrangement and configuration of the query gateway system, other arrangements and configurations are possible.

As shown, FIG. 2 includes a computing environment 200 of a computing system having a server device 202 and a client device 230, which are connected by a network 240. Further details regarding these and other computing devices are provided below in connection with FIG. 9. In addition, FIG. 9 also provides additional details regarding networks, such as the network 240 shown.

As shown, the server device 202 includes a content management system 204 that manages digital content hosted and/or accessed by the server device 202. For example, the content management system 204 facilitates users to perform searches of digital content from websites, databases, or data stores across the Internet.

As also shown, the content management system 204 on the server device 202 includes the query gateway system 206. In some implementations, the query gateway system 206 is located outside of the content management system 204. In various implementations, portions of the query gateway system 206 are located across different components.

As mentioned above, the query gateway system 206 provides a framework that serves as a context-retaining gateway between autosuggest queries of an autosuggest query search system and a GLM system (e.g., an AI chat system). In many implementations, the query gateway system 206 implements one or more features, such as AI chat eligibility and reformulated autosuggest queries, to provide improved efficiency and accuracy when facilitating the transition between search systems. Additionally, the query gateway system 206 utilizes separate user interfaces to streamline navigation and remove disruptions when transitioning between search systems. In addition, the content management system 204 includes the autosuggest query system 226 and the GLM system 228, which may be located outside of the content management system 204 and/or on different computing devices than the server device 202 (e.g., the GLM system 228 is located on a different cloud computing system).

As shown, the query gateway system 206 includes various components and elements, which are implemented in hardware and/or software. For example, the query gateway system 206 includes an autosuggest query manager 210 that communicates with the autosuggest query system 226 to generate, identify, refine, and determine autosuggest queries for text input corresponding to a user search query. In addition, the query gateway system 206 includes a query eligibility manager 212 that identifies, generates, and/or utilizes GLM-eligible queries 220 to determine when autosuggest queries are eligible to successfully operate with the GLM system 228. Additionally, the query gateway system 206 includes a query reformulation manager 214 to determine reformulated queries 222 (e.g., reformulated autosuggest queries) for autosuggest queries to be provided to the GLM system 228. Further, the query gateway system 206 includes a GLM manager 216 that communicates with the GLM system 228 to facilitate the generation of narrative query responses (e.g., AI chat responses) utilizing GLM models.

Additionally, the query gateway system 206 includes a storage manager 218. In various implementations, the storage manager 218 stores data corresponding to the query gateway system 206. As shown, the storage manager 218 includes the GLM-eligible queries 220, the reformulated queries 222, and machine-learning models 224. The machine-learning models 224 can include some or all of the GLM eligibility models (e.g., a classifier model), query reformulation models (a sequence-to-sequence model or a lightweight language model), and/or models corresponding to the autosuggest query system 226 (e.g., an autosuggest query generation model) and/or the GLM system 228 (e.g., an LLM).

In addition, the computing environment 200 includes the client device 230 having a client application 232. In various implementations, the client device 230 is associated with a user who provides text input and/or desires more robust narrative-based query responses from an AI chat system. In many implementations, a user interacts with the server device 202 (e.g., the content management system 204 and/or the query gateway system 206) to access content and/or services. The computing environment 200 can include any number of client devices.

As also shown, the client device 230 includes a client application 232. For example, the client application 232 is a web browser application, a mobile application, or another type of application that accesses internet-based content for accessing and receiving digital content. In some implementations, the client device 230 includes a plugin associated with the query gateway system 206 that communicates with the client application 232 to perform corresponding actions. In some implementations, a portion of the query gateway system 206 is integrated into the client application 232 to perform corresponding actions.

With the foundation of the query gateway system 206 in place, additional details regarding various functions of the query gateway system 206 will now be described. As noted above, FIG. 3 provides additional details of the query gateway system 206. In particular, FIG. 3 illustrates an example diagram of utilizing autosuggest queries with both an autosuggest query system and a generative language model system according to some implementations.

Figure 3:
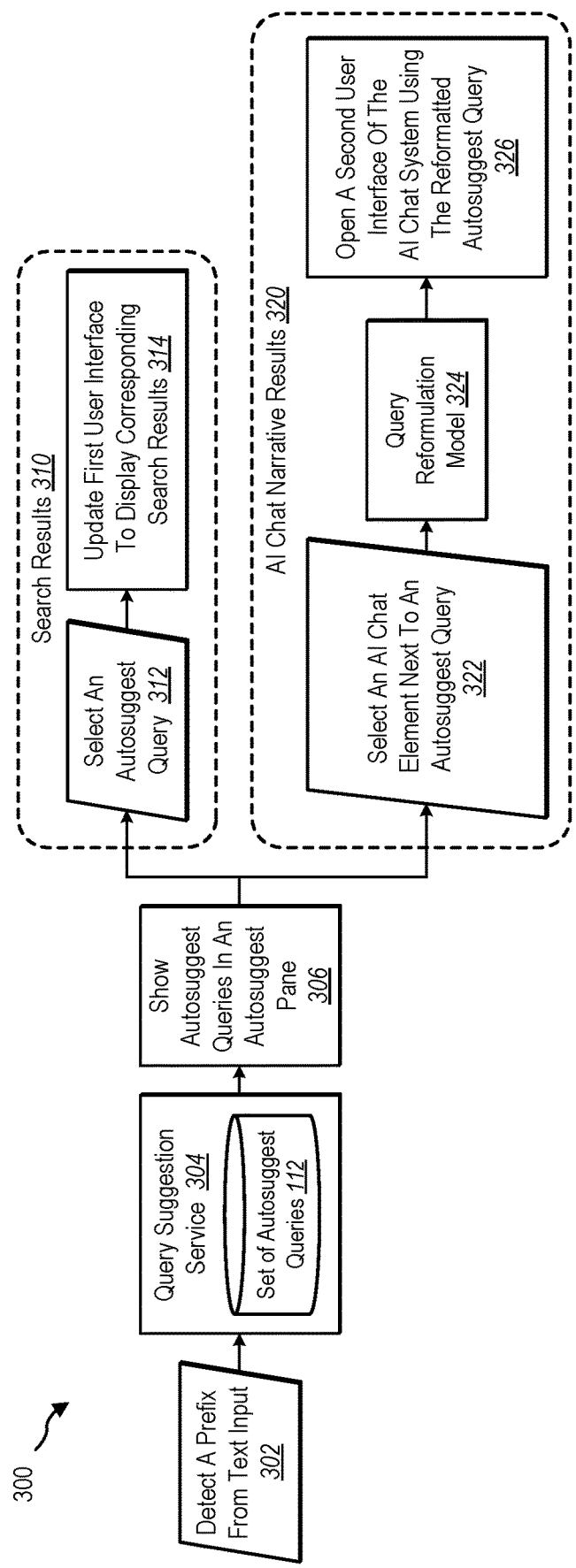
FIG. 3 illustrates a flow diagram example of utilizing autosuggest queries with both an autosuggest query system and a generative language model system.

As shown, FIG. 3 includes a flow 300 that provides an initial overview of providing query results to a user from either an autosuggest query search system or a GLM query system (i.e., a GLM system). To illustrate, the flow 300 includes the act 302 of detecting a prefix from text input. For example, the user is presented with a first user interface that includes a text input field for entering characters of text into a search query. In this document, a "prefix" refers to the partial text input provided by the user before any suggestions or completions are displayed.

In response to detecting the prefix, a query suggestion service 304 (e.g., a part of the autosuggest query system) searches through the set of autosuggest queries 112 to determine relevant or matching autosuggest queries. To illustrate, the flow 300 includes the act 306 of showing the relevant autosuggest queries in an autosuggest pane. For example, upon determining the autosuggest queries, the first user interface updates to show an autosuggest pane below the text input field that includes the relevant autosuggest queries.

At this point, the flow 300 may branch into two paths. In the first path corresponding to search results 310, the flow 300 includes act 312 of an autosuggest query being selected. For example, a user selects one of the autosuggest queries. In response, the autosuggest query system updates the first user interface to display the search results corresponding to the selection, as shown in act 314.

In the second path corresponding to the AI chat narrative results 320, the flow includes the act 322 of selecting an AI chat element next to an autosuggest query. As mentioned above, the query gateway system 206 generates and provides AI chat elements (i.e., GLM elements) for one or more of the autosuggest queries within the first user interface. The query gateway system 206 then detects when a user selects one of the AI chat elements.

As shown, the flow 300 includes a query reformulation model 324. In various implementations, upon selection of one of the AI chat elements, the query reformulation model 324 generates a reformulated autosuggest query based on the autosuggest query corresponding to the selected AI chat element. The query gateway system 206 then provides the reformulated autosuggest query to the AI chat system (i.e., the GLM system).

Additionally, as shown, the flow 300 includes the act 326 of opening a second user interface of the AI chat system using the reformulated autosuggest query. For example, in connection with providing the reformulated autosuggest query to the AI chat system, the query gateway system 206 causes the AI chat system to execute the reformulated autosuggest query using an AI chat model (e.g., a GLM) and generate a narrative query response. In this way, when the user moves to the second user interface, the narrative query response is either waiting for the user or is in the process of being generated.

Figure 4A:
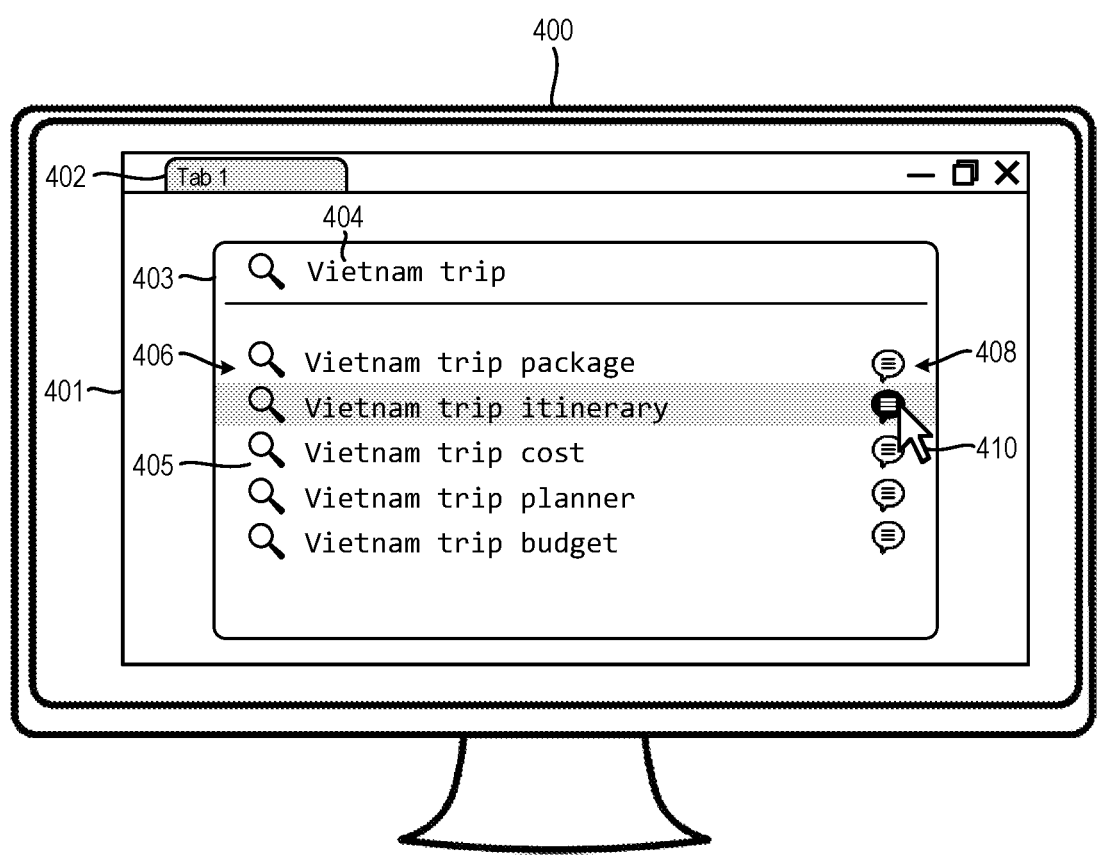
FIGS. 4A-4B illustrate graphical user interface examples of automatically providing context-retained autosuggest queries from an autosuggest query system user interface to a generative language model system user interface.
Figure 4B:
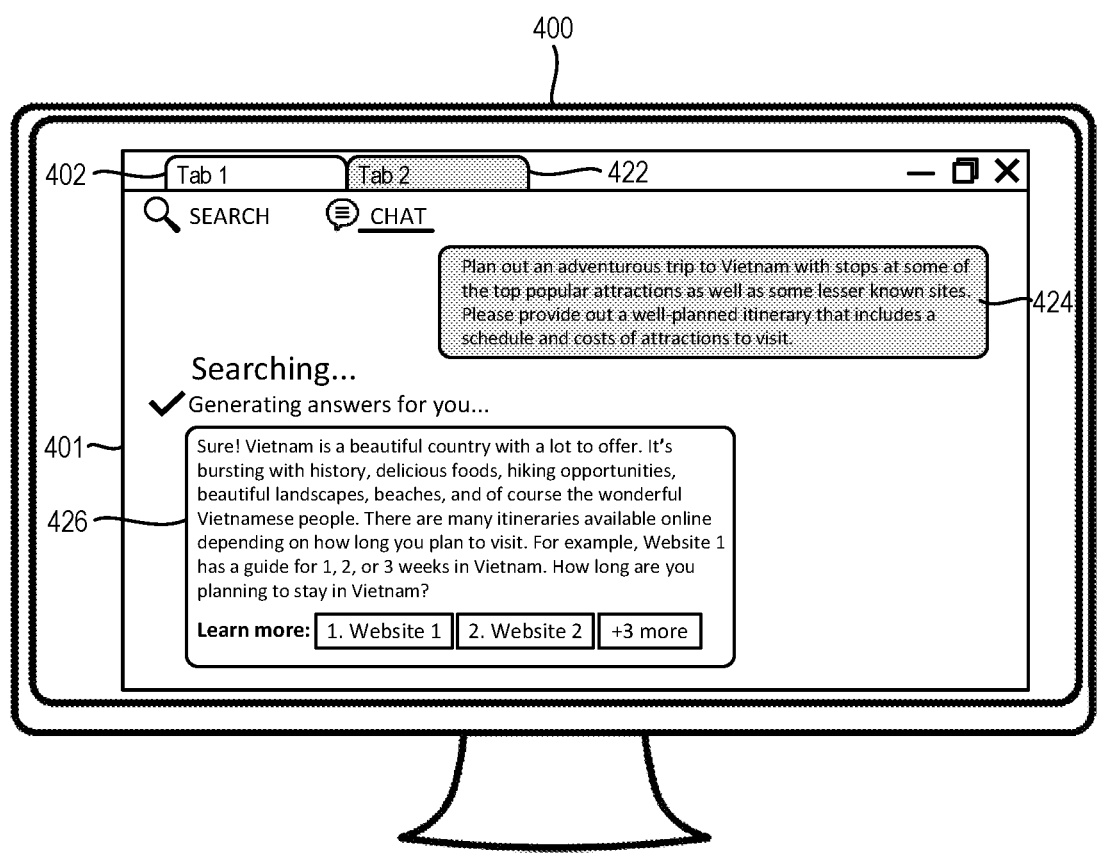

FIGS. 4A-4B provide graphical examples of the process. In particular, FIGS. 4A-4B illustrate example graphical user interfaces of automatically providing context-retained autosuggest queries from an autosuggest query system user interface to a generative language model system user interface. As shown, FIGS. 4A-4B include a client device 400 (e.g., a laptop, desktop, smartphone, or tablet) that includes a display. The client device 400 can run an operating system (OS) that implements various systems, programs, applications, and services. For example, the client device 400 implements a client application 401, such as a web browser.

In FIG. 4A, the client application 401 includes a first user interface 402, shown as a browser tab. The first user interface corresponds to a search query page and includes an input field 403 where a user can provide text input or another type of input (e.g., audio or an image) for the search query. As shown, the input field 403 includes text input 404 (e.g., a prefix). As also shown, the first user interface 402 includes an autosuggest pane 405 that displays autosuggest queries 406 corresponding to the text input 404.

Additionally, the first user interface 402 shows AI chat elements 408 next to each of the autosuggest queries 406. In various implementations, one or more of the autosuggest queries 406 do not include an AI chat element, as discussed below. In some implementations, the first user interface 402 includes a popup, additional text, or other guidance indicating the purpose and function of the AI chat elements 408. For example, the first user interface 402 includes a tutorial that explains that the AI chat elements 408 will open a new, separate user interface where a corresponding autosuggest query is used as an initial query with an AI chat system.

As shown, FIG. 4A includes the selection of one of the autosuggest queries 406 using a pointer (e.g., a mouse or finger). For example, the selected autosuggest query 410 is highlighted with a different graphic for its AI chat element upon being selected.

Upon detecting the selection of the selected autosuggest query 410, the query gateway system 206 triggers a transition to the AI chat system. As noted above, in some implementations, the query gateway system 206 reformulates the autosuggest query before providing it to the AI chat system. In one or more implementations, the query gateway system 206 directly provides the selected autosuggest query 410 to the AI chat system for processing and/or provides reformulating instructions.

Turning to FIG. 4B, this figure shows the client device 400 with the client application 401, which now displays a second user interface 422. Note that the first user interface 402 is still present but is temporarily in the background. The second user interface 422 corresponds to the AI chat system (i.e., the GLM system) and provides a narrative-based experience to the user, offering more comprehensive query responses.

The second user interface 422 includes a reformulated autosuggest query 424. To elaborate, the selected AI chat element corresponded to the autosuggest query "Vietnam trip itinerary." Using this as a prompt, the query gateway system 206 generated a more robust and comprehensive query formulated into a sentence, which is used as the input query to the AI chat model. In some implementations, the query gateway system 206 provides the corresponding autosuggest query to the AI chat model with or without additional text inputs.

In response, the AI chat model generates and provides the user with a narrative query response 426. The narrative query response 426 serves as a starting point for a conversation with the user, providing more information on the given topic in the second user interface 422. Further, as shown, the AI chat system offers additional prompts to further the conversation.

As mentioned earlier, the client application 401 maintains the first user interface 402 when the selected autosuggest query 410 is triggered and the second user interface 422 is generated. After the selection of the selected autosuggest query 410, the user can easily navigate to the second user interface 422 that includes an automatically generated version of the narrative query response 426. Additionally, the user can select another AI chat element within the autosuggest queries 406, which will cause the query gateway system 206 to generate a third user interface that includes another instance of the AI chat system, applying the context of the newly selected AI chat element accurately and automatically.

Further, for each selected AI chat element, the query gateway system 206 may trigger a new instance of the AI chat system along with context-retained queries in a new user interface. In these implementations, the query gateway system 206 provides the user with quick access to each autosuggest query of interest with minimal user effort.

Additionally, when the reformulated autosuggest query 424 is displayed, the user can quickly navigate back to the first user interface 402, which retains the text input 404 and the autosuggest queries 406 previously provided. This allows the user to proceed to a search result or select another AI chat element to interact with the AI chat system. Indeed, the query gateway system 206 facilitates simple, efficient, accurate, and quick navigation between the autosuggest query system and instances of the GLM system with minimal effort required by the user, reducing the likelihood of user errors that often occur when navigating under existing systems.

Figure 5:
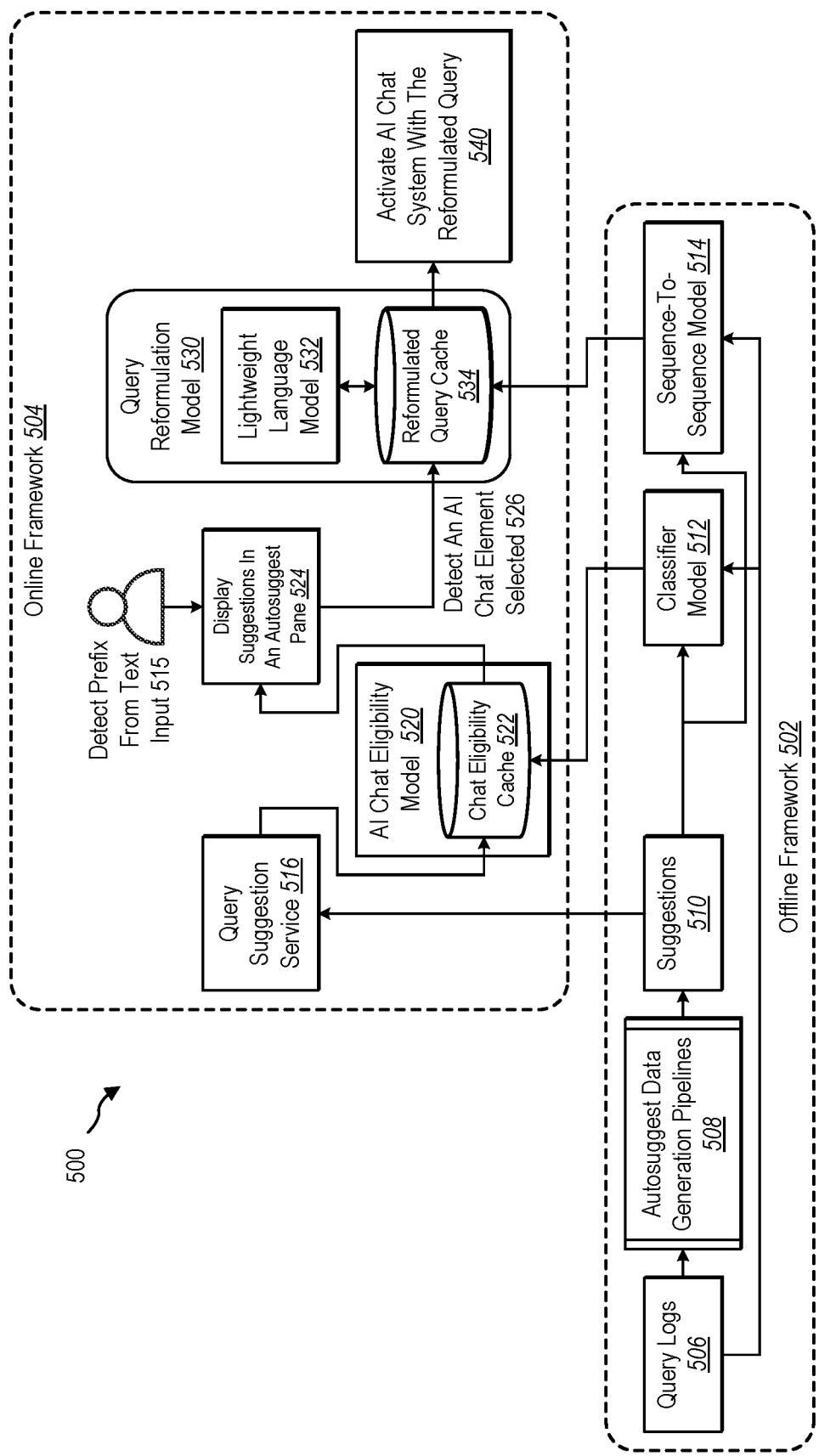
FIG. 5 illustrates an example block diagram for providing reformulated autosuggest queries based on an autosuggest query system to a generative language model system.

FIG. 5 illustrates an example block diagram for providing reformulated autosuggest queries based on an autosuggest query system to a generative language model system according to some implementations. In particular, FIG. 5 shows a framework 500 that the query gateway system 206 utilizes to facilitate a smooth gateway between the autosuggest query system and the GLM system (e.g., AI chat system). To illustrate, the framework 500 includes an offline framework 502 and an online framework 504.

In various implementations, the offline framework 502 provides functions and operations that the query gateway system 206 and/or an autosuggest query system perform in non-real-time, such as on a periodic schedule or when a threshold is satisfied. To illustrate, the offline framework 502 includes query logs 506. In various implementations, the query logs 506 include previous search queries performed by users and can include metadata associated with the search. Additionally, the offline framework 502 shows autosuggest data generation pipelines 508 that generate suggestions 510 (e.g., autosuggest queries) from previous text inputs within the query logs 506.

In various implementations, the suggestions 510 are stored in an autosuggest query cache or another type of data storage medium. Additionally, the suggestions 510 are stored in different data structures such as prefix-based tries, inverted indices, or other data structures that pair text prefixes and corresponding metadata with autosuggest queries.

In addition, the offline framework 502 includes a classifier model 512. In various implementations, the classifier model 512 employs a machine learning algorithm that is trained to assign input queries to specific categories or classes. In this case, the classifier model 512 is trained to classify whether an autosuggest query is properly suited for the AI chat model. To elaborate, not all autosuggest queries are well-suited for the AI chat system. For example, an autosuggest query of "Bing" or "Microsoft Outlook web email login" may not be suitable to be provided to the AI chat system as the searching user desired to quickly access the requested resource and not discover more information about it.

In various implementations, the query gateway system 206 can train the classifier model 512 to classify the suggestions 510 using previous text inputs within the query logs 506. In some instances, each of the suggestions 510 is assigned a binary value indicating whether it is suitable for the AI chat system. In some implementations, the classifier model 512 determines the probability that an autosuggest query (e.g., suggestion) is suitable for the AI chat system. As mentioned, the query gateway system 206 can regularly update the suggestion classifications upon updating the classifier model 512. As also shown, the classifier model 512 stores the classified suggestions in a chat eligibility cache 522 (i.e., generative language model eligibility cache), which is further discussed below.

Similarly, the query gateway system 206 can train a sequence-to-sequence model 514 (Seq2Seq Model) to generate reformulated autosuggest queries from the suggestions 510 (e.g., autosuggest queries). In various implementations, the sequence-to-sequence model is a deep-learning machine-learning language model that maps input sequences to output sequences through an encoding and decoding process. The sequence-to-sequence model 514 can represent different types of language models, such as a large language model (LLM).

The sequence-to-sequence model 514 receives an autosuggest query and generates a reformulated autosuggest query. In many implementations, the reformulated autosuggest query is more verbose, robust, and longer than the corresponding autosuggest query. For example, the autosuggest query may be a string of 3-5 words, a string of nouns, and/or a poorly worded sentence. In contrast, the reformulated autosuggest query includes 2-3 full sentences that provide context for the query, a query framework, a scenario-based statement, a long-form question, and/or a detailed query request. Indeed, the sequence-to-sequence model 514 generates reformulated autosuggest queries that yield more accurate and complete narrative query responses by an AI chat system.

As shown, the sequence-to-sequence model 514 stores the reformulated autosuggest queries in a reformulated query cache 534, which is further discussed below. Additionally, the query gateway system 206 regularly updates the sequence-to-sequence model 514 based on query logs 506 and suggestions 510 to generate new reformulated autosuggest queries and/or update existing reformulated autosuggest queries.

In various cases, the classifier model 512 and the sequence-to-sequence model 514 are combined into a single machine-learning model. For example, the query gateway system 206 generates a single multi-task model that jointly trains on the same input data to receive different prompts and provide different corresponding outputs. For example, the multi-task model is an LLM or another type of generative language model.

In various implementations, the online framework 504 allows the query gateway system 206 to provide real-time features to users regarding the autosuggest query system and the GLM system. To illustrate, the online framework 504 includes an initial trigger 515 that detects a prefix from the text input of a user. For example, when a user visits a website that offers search capabilities, they provide text input into a text input field within a first user interface.

In response, the autosuggest query system displays suggestions in an autosuggest pane also located in the first user interface, as shown in act 524. In particular, the autosuggest query system utilizes a query suggestions service 516 within the online framework 504 that determines autosuggest queries from the prefix in real-time. For example, the query suggestions service 516 accesses the suggestions 510 (e.g., a set of autosuggest queries) in a suggestions cache and determines relevant autosuggest queries in real-time in response to detecting one or more prefixes. In various implementations, the query suggestions service 516 includes a prefix-based tree (e.g., a prefix-tree) service, a non-prefix matching service, a language model-based next word service, or another service for determining autosuggest queries from the set of autosuggest queries for a given prefix.

Additionally, the online framework 504 includes an AI chat eligibility model 520 with the chat eligibility cache 522. In various implementations, when the query suggestions service 516 determines an autosuggest query for a prefix, the query gateway system 206 determines whether the autosuggest query is suitable for the AI chat system.

To elaborate, in some implementations, the query gateway system 206 utilizes the AI chat eligibility model 520 to determine if a given autosuggest query is located within the chat eligibility cache 522. If a match is found within the chat eligibility cache 522, the query gateway system 206 generates and provides an AI chat element to be displayed with the given autosuggest query within the autosuggest pane (e.g., the act 524). In some implementations, the query gateway system 206 determines a match based on a threshold number or amount of matching words. In various implementations, the AI chat eligibility model 520 is a machine-learning model that determines a match based on the proximity of the autosuggest query to an eligible autosuggest query within the vector space. If a match is not found for a given autosuggest query, the query gateway system 206 does not provide an AI chat element to be displayed with the given autosuggest query within the autosuggest pane of the first user interface.

In various implementations, the chat eligibility cache 522 stores only eligible autosuggest queries. In alternative implementations, the chat eligibility cache 522 stores only ineligible autosuggest queries that the query gateway system 206 knows are not well-suited to the AI chat system. In some implementations, the chat eligibility cache 522 stores both eligible and ineligible autosuggest queries with a positive or negative eligibility indication.

In some implementations, the online framework 504 excludes or omits the AI chat eligibility model 520. In these implementations, the query gateway system 206 generates an AI chat element for every autosuggest query provided within the autosuggest pane.

As shown, the online framework 504 includes another trigger 526 that detects a selected AI chat element (e.g., a clicked AI chat suggestion). For example, when a user selects an AI chat element, the query gateway system 206 identifies the corresponding autosuggest query. In many instances, the corresponding autosuggest query refers to the autosuggest query displayed next to or in line with the selected AI chat element. The query gateway system 206 then sends the corresponding autosuggest query to the AI chat system via a query reformulation model 530.

As shown, the query reformulation model 530 includes a lightweight language model 532 and the reformulated query cache 534. As mentioned earlier, the query gateway system 206 utilizes the query reformulation model 530 to generate a reformulated autosuggest query from an input autosuggest query. For example, the query gateway system 206 provides the corresponding autosuggest query to the query reformulation model 530, which determines a reformulated autosuggest query.

In some implementations, the query reformulation model 530 determines whether the corresponding autosuggest query is present in the reformulated query cache 534. If so, the query reformulation model 530 identifies the reformulated autosuggest query associated with the corresponding autosuggest query from the reformulated query cache 534. Otherwise, the query reformulation model 530 utilizes the lightweight language model 532 to determine a reformulated autosuggest query for the corresponding autosuggest query in real time (e.g., on-the-fly). Additional details regarding determining a reformulated autosuggest query are provided in connection with FIG. 6 below.

In various implementations, the lightweight language model 532 is a smaller, simpler, and faster version of the sequence-to-sequence model 514. For example, while the sequence-to-sequence model 514 is an LLM, the lightweight language model 532 is an LSTM or another type of language machine-learning model. In many implementations, the lightweight language model 532 is a classifier-type model that operates within specified low latency parameters to ensure real-time processing (e.g., providing a reformulated autosuggest query within a few milliseconds).

In some implementations, the online framework 504 excludes or omits the query reformulation model 530. For example, instead of determining a reformulated autosuggest query, the query reformulation model 530 directly provides the corresponding autosuggest query to the AI chat system. In some cases, if a reformulated autosuggest query is present in the reformulated query cache 534, the query reformulation model 530 provides it to the AI chat system; otherwise, it provides the corresponding autosuggest query to the AI chat system.

Additionally, the online framework 504 includes activating the AI chat system with the reformulated autosuggest query, as shown in act 540. For example, the query gateway system 206 provides the reformulated autosuggest query to the AI chat system along with instructions that cause the AI chat system to execute the reformulated autosuggest query.

As described above, in various implementations, the AI chat system opens new, separate user interfaces. For example, an instance of the AI chat system appears in a new browser tab or window. In some cases, the AI chat system starts within another application. Moreover, in one or more implementations, the AI chat system opens as a background service (e.g., as a new tab without browser focus) and becomes visible when selected by a user. In different implementations, the AI chat system surfaces or becomes visible when the AI chat element is selected, triggering a transition to the AI chat system.

Figure 6:
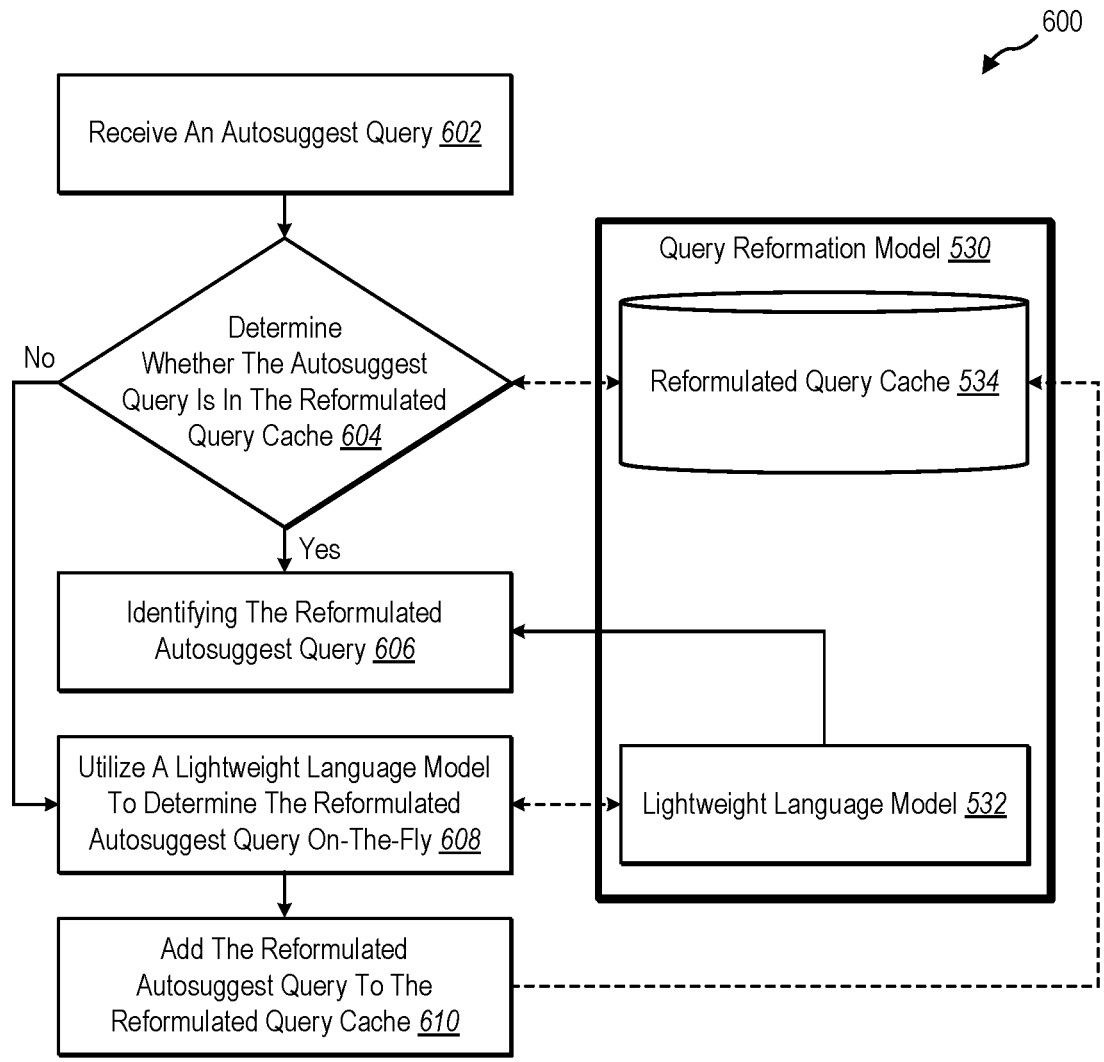
FIG. 6 illustrates a flow diagram example for generating reformulated autosuggest queries from an autosuggest query.

As mentioned above, FIG. 6 provides additional details regarding the determination of a reformulated autosuggest query. In particular, FIG. 6 illustrates an example flow diagram for generating reformulated autosuggest queries from an autosuggest query according to some implementations. As shown, FIG. 6 includes a series of acts 600 along with the query reformulation model 530 included in FIG. 5. In particular, the series of acts 600 correspond to components of the query reformulation model 530.

As shown, the series of acts 600 includes the act 602 of receiving an autosuggest query. For example, based on detecting a user selecting an AI chat element, the query gateway system 206 provides the corresponding autosuggest query to the query reformulation model 530.

In addition, the series of acts 600 includes the act 604 of determining whether the autosuggest query is in the reformulated query cache 534. For instance, the query gateway system 206 queries the reformulated query cache 534 to determine if the autosuggest query matches an entry of autosuggest queries in the reformulated query cache 534. If a match is found (e.g., a cache hit), the query gateway system 206 identifies one or more reformulated autosuggest queries mapped to the matching autosuggest query. Indeed, the query gateway system 206 identifies the reformulated autosuggest query, as shown in the act 606

In some implementations, the query reformulation model 530 is a machine-learning model that determines a match based on the proximity of the provided autosuggest query to an autosuggest query within the reformulated query cache 534 within the vector space. For example, the query reformulation model 530 generates a feature vector for the provided autosuggest query and determines if the feature vector maps within a threshold distance to a feature vector of a known autosuggest query within the learned vector space. In some implementations, the query gateway system 206 determines a match based on a threshold number or amount of matching or overlapping words.

If a match is not found in the reformulated query cache 534 (e.g., a cache miss), the query gateway system 206 performs the act 608 of utilizing a lightweight language model 532 to determine the reformulated autosuggest query on-the-fly. As mentioned, the lightweight language model 532 generates a new reformulated autosuggest query for the provided autosuggest query within a low-latency time threshold (e.g., a few milliseconds). Additionally, the query gateway system 206 adds the newly determined reformulated autosuggest query to the reformulated query cache 534, as shown in the act 610.

In some implementations, the query gateway system 206 also provides the autosuggest query to the classifier model mentioned above to generate a reformulated autosuggest query offline and provide it to the reformulated query cache 534. This way, the reformulated query cache 534 includes up-to-date versions of reformulated autosuggest queries that map to autosuggest queries.

In some implementations, the lightweight language model (or the classifier model) also utilizes additional context to determine a reformulated autosuggest query, such as previous searches, adjacent autosuggest queries, user information, location information, or other information. For example, the lightweight language model 532 performs a forward search with the autosuggest query and accesses the top three results (e.g., the title, header information, page information, and/or metadata) and utilizes this content to generate a better reformulated autosuggest query for the autosuggest query.

As mentioned above, by utilizing the reformulated query cache 534 to identify reformulated autosuggest queries, the query gateway system 206 does not have to reprocess the same queries again, reducing wasted processing and improving efficiency. Furthermore, by utilizing an online lightweight language model and an offline classifier model, the query gateway system 206 capitalizes on resource efficiency to produce highly accurate results without sacrificing latency, making the user wait for the query gateway system 206 to process requests.

Figure 7A:
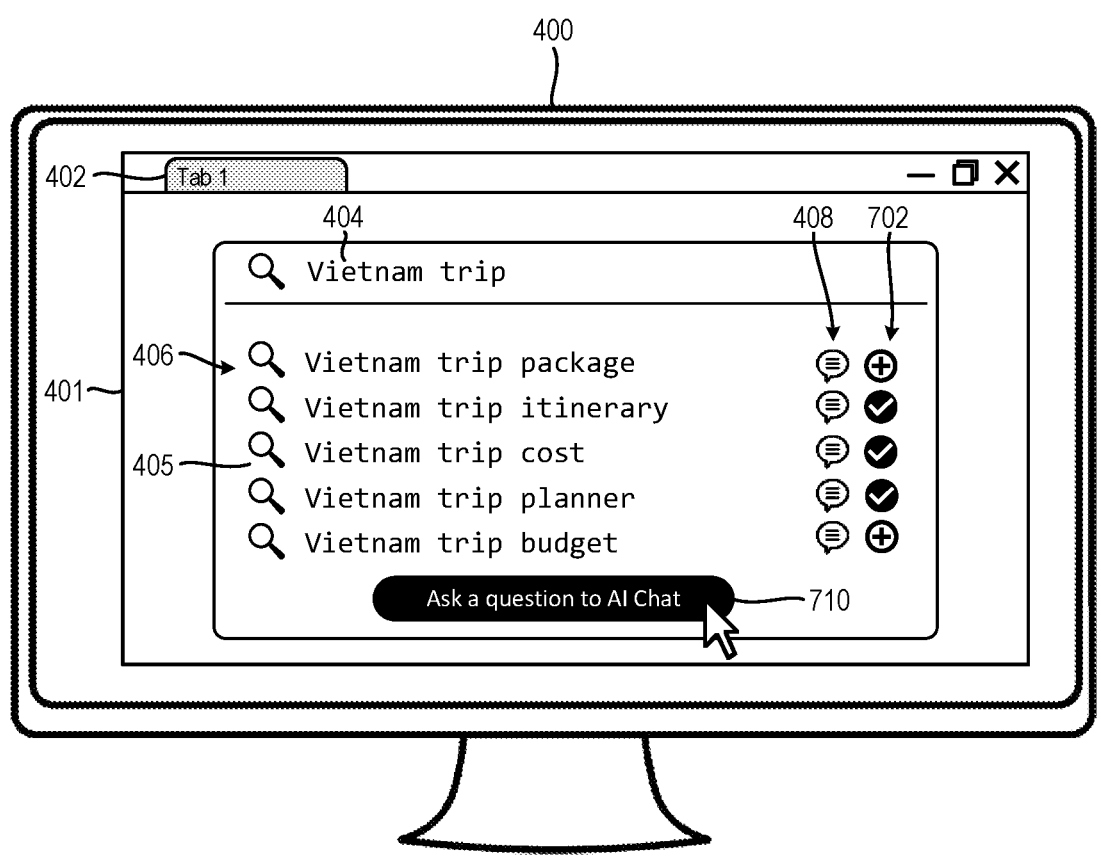
FIGS. 7A-7B illustrate example graphical user interfaces that generate a narrative-based response using a generative language model from multiple autosuggest queries.
Figure 7B:
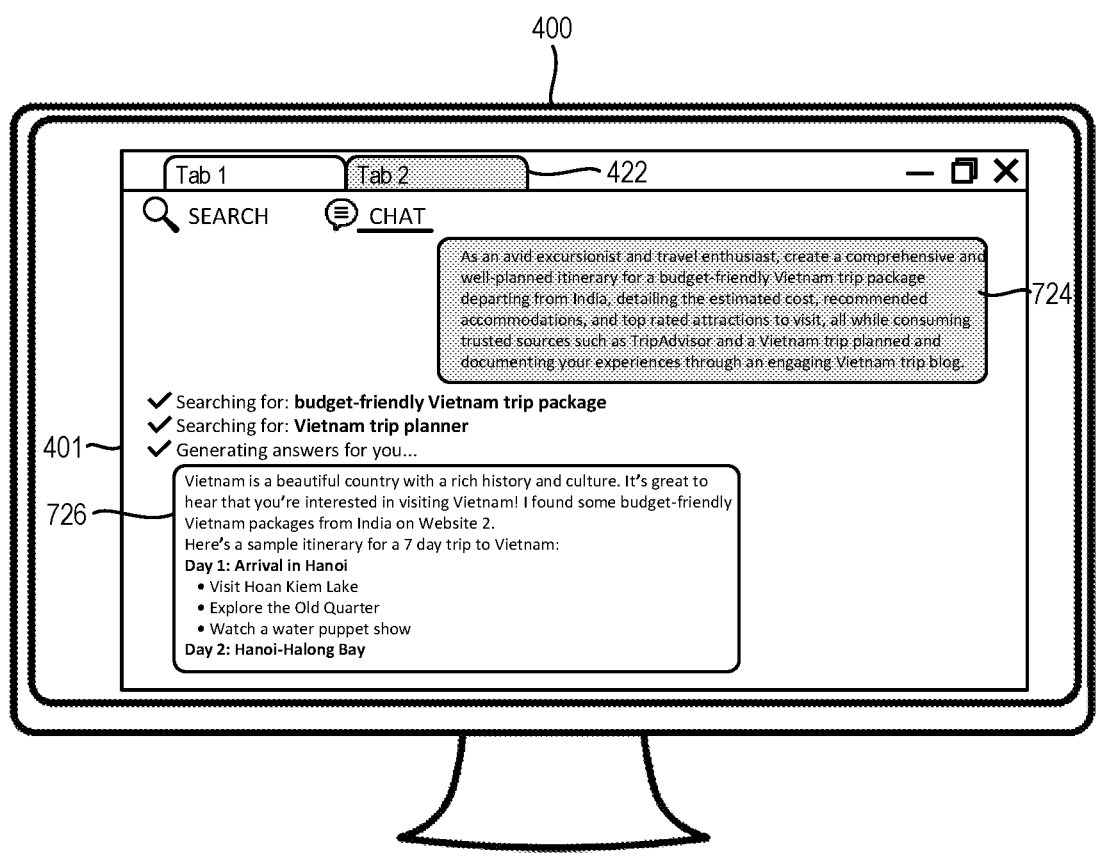

FIGS. 7A-7B illustrate example graphical user interfaces for generating a narrative-based response with a generative language model from multiple autosuggest queries according to some implementations. For ease of explanation, FIGS. 7A-7B include the client device 400 described above, which has the client application 401 and the first user interface 402. For example, the first user interface 402 includes the text input 404, the autosuggest pane 405, the autosuggest queries 406, and the AI chat elements 408 described above.

In addition, the client application 401 includes autosuggest query selection elements 702 and a selection confirmation element 710. For example, in the illustrated embodiment, the query gateway system 206 allows a user to select multiple autosuggest queries generated for the text input 404. As shown, many of the autosuggest queries 406 are selected, indicated with a checkmark.

Upon detecting the selection of the selection confirmation element 710, the query gateway system 206 can trigger the AI chat system as before. For example, the query gateway system 206 provides each of the autosuggest queries corresponding to a selected autosuggest query selection element to the query reformulation model, which generates a reformulated autosuggest query. In these implementations, the query reformulation model may process each of the provided autosuggest queries and generate a verbose, comprehensive, and/or summarizing reformulated autosuggest query.

To illustrate, FIG. 7B shows the first user interface 402 of the client application 401 on the client device 400. Notably, the first user interface 402 of the AI chat system shows a reformulated autosuggest query 724 (e.g., a single query) that is much longer and more verbose than the individually selected autosuggest queries. Additionally, the reformulated autosuggest query 724 is formulated in a comprehensive context-retained query that causes the AI chat system to provide a narrative query response 726 that is highly accurate and helpful to the user.

While FIG. 7A shows the autosuggest query selection elements 702 in the autosuggest pane of the first user interface 402, additional implementations can include additional or different elements. For example, the autosuggest pane 405 may include an element to open the search results in a new tab or different AI chat elements to trigger various AI chat services. Another example is an autosuggest query that incorporates an element performing multiple functions, such as opening the search results of the autosuggest query in a new tab while simultaneously triggering the AI chat system in another new tab.

Additionally, this disclosure has described implementations of the query gateway system 206 providing a seamless gateway between query search services and the AI chat system. While search engine examples have been used to illustrate the autosuggest query system, the query gateway system 206 can also function with other types of autosuggest query systems. These systems may include content-based sites that offer autosuggest queries as users search for articles or other content or e-commerce sites that suggest products and services. Additionally, the query gateway system 206 may operate wherever autosuggest queries are provided to a user, such as a search text field, a browser bar, an operating system search box, or a multi-functional search box.

Figure 8:
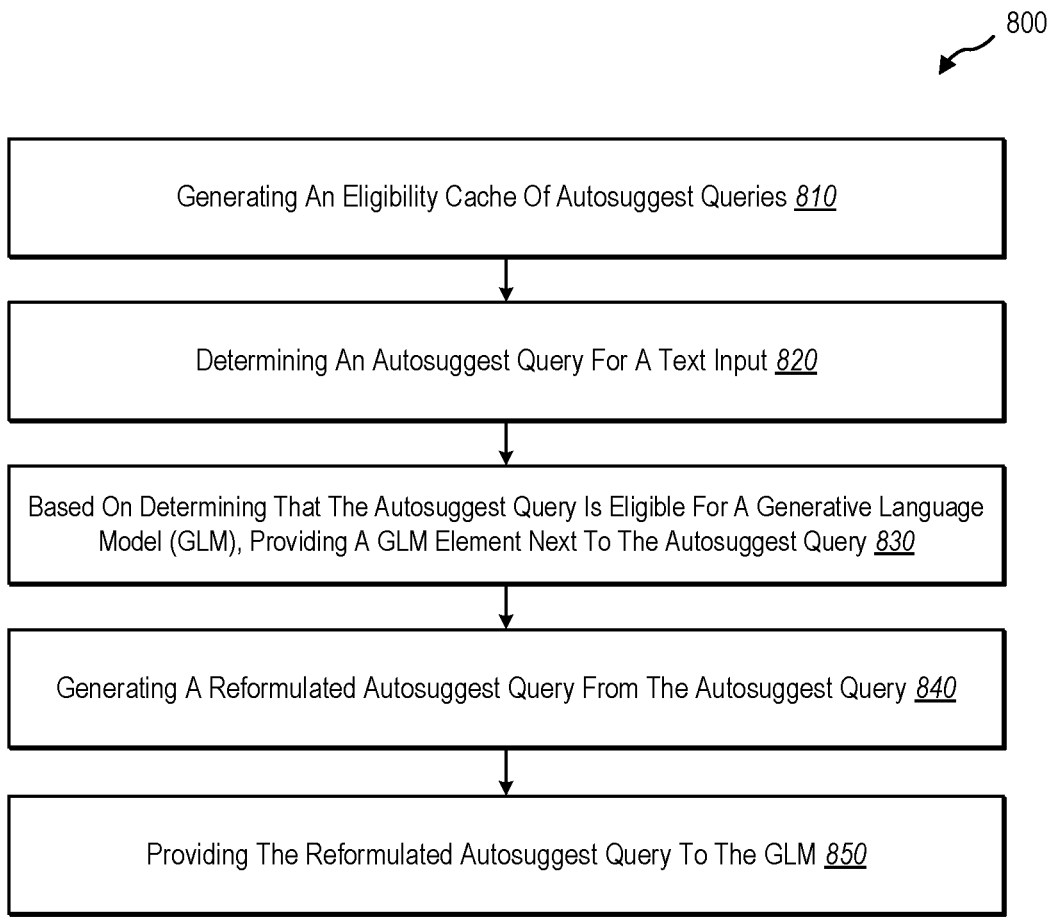
FIG. 8 illustrates an example series of acts in a computer-implemented method for generating narrative query responses utilizing generative language models.

Turning now to FIG. 8, this figure illustrates an example flowchart that includes a series of acts for utilizing the query gateway system 206 according to one or more implementations. In particular, FIG. 8 illustrates an example series of acts of computer-implemented methods for generating narrative query responses utilizing generative language models according to one or more implementations.

While FIG. 8 illustrates acts according to one or more implementations, alternative implementations may omit, add, reorder, and/or modify any of the acts shown. Further, the acts of FIG. 8 can be performed as part of a method such as a computer-implemented method. Alternatively, a non-transitory computer-readable medium can include instructions that, when executed by a processing system comprising a processor, cause a computing device to perform the acts of FIG. 8. In further implementations, a system can perform (e.g., a processing system with a processor can cause instructions to be performed) the acts of FIG. 8.

As shown, the series of acts 800 includes an act 810 of generating an eligibility cache of autosuggest queries. For example, the act 810 involves generating a generative language model eligibility cache of autosuggest queries. In various implementations, the act 810 includes generating a generative language model eligibility cache of autosuggest queries by classifying the autosuggest queries according to a generative language model.

In some implementations, the act 810 includes generating a generative language model eligibility cache of autosuggest queries by classifying the autosuggest queries according to the generative language model, determining that the autosuggest query is eligible for the generative language model by identifying the autosuggest query in the generative language model eligibility cache, and providing the generative language model element for display next to the autosuggest query within the first user interface based on determining that the autosuggest query is eligible for the generative language model.

As further shown, the series of acts 800 includes an act 820 of determining an autosuggest query for text input. For instance, in example implementations, the act 820 involves determining an autosuggest query from a set of autosuggest queries in response to receiving text input corresponding to a search query. In one or more implementations, the act 820 includes determining an autosuggest query from a set of autosuggest queries in response to receiving text input corresponding to a search query.

In various implementations, the act 820 includes receiving text input corresponding to a search query from a client device. In various implementations, the act 820 includes determining an autosuggest query from a set of autosuggest queries stored in an autosuggest query database based on the text input. In one or more implementations, the act 820 includes generating the generative language model eligibility cache of autosuggest queries based on query logs of previous text inputs and a classifier model.

As further shown, the series of acts 800 includes an act 830 of providing a GLM element next to the autosuggest query based on determining that the autosuggest query is eligible for a generative language model (GLM). For instance, in example implementations, the act 830 involves providing a generative language model element for display next to the autosuggest query within a first user interface based on determining that the autosuggest query is eligible for a generative language model using the generative language model eligibility cache.

In one or more implementations, the act 830 includes providing a generative language model element for display next to the autosuggest query within a first user interface. In some implementations, the act 810 includes providing a generative language model element for display next to the autosuggest query within a first user interface based on determining that the autosuggest query is eligible using the generative language model eligibility cache. In various implementations, the act 830 includes determining that the autosuggest query is eligible for the generative language model by identifying the autosuggest query in the generative language model eligibility cache.

In some implementations, the act 830 includes determining that an additional autosuggest query is not eligible for the generative language model. Based on the additional autosuggest query not being eligible for the generative language model, the act 830 also includes determining to not provide any generative language model element for display next to the additional autosuggest query within the first user interface. In various implementations, the act 830 includes displaying the generative language model element with the autosuggest query in an autosuggest user interface pane, where the autosuggest user interface pane includes a second autosuggest query displayed with a second generative language model element and a third autosuggest query displayed without any generative language model element.

As further shown, the series of acts 800 includes an act 840 of generating a reformulated autosuggest query from the autosuggest query. For instance, in example implementations, the act 840 involves generating a reformulated autosuggest query from the autosuggest query in response to detecting a selection of the generative language model element.

In one or more implementations, the act 840 include generating a reformulated autosuggest query from the autosuggest query utilizing a reformulation model, which includes a lightweight language model and a reformulated query cache, in response to detecting a selection of the generative language model element in the first user interface. In some implementations, the act 840 includes generating a reformulated autosuggest query from the autosuggest query utilizing a reformulation model in response to detecting the selection of the generative language model element in the first user interface and providing the reformulated autosuggest query as the autosuggest query to the generative language model.

In various implementations, the act 840 includes generating the reformulated autosuggest query from the autosuggest query by determining that the autosuggest query is in a reformulated query cache and identifying the reformulated autosuggest query in the reformulated query cache associated with the autosuggest query. In some implementations, the act 840 includes generating reformulated autosuggest queries for the reformulated query cache from previous autosuggest queries utilizing a sequence-to-sequence machine-learning model. According to some implementations, the reformulated autosuggest query is generated from the autosuggest query by determining that the autosuggest query is not in a reformulated query cache, utilizing a lightweight language model to determine the reformulated autosuggest query on-the-fly, and adding the reformulated autosuggest query to the reformulated query cache for the autosuggest query.

In some implementations, the act 840 includes generating the reformulated autosuggest query from the autosuggest query by determining that the autosuggest query is in the reformulated query cache and identifying the reformulated autosuggest query in the reformulated query cache associated with the autosuggest query. In various implementations, the reformulated autosuggest query is more verbose than the autosuggest query.

As further shown, the series of acts 800 includes an act 850 of providing the reformulated autosuggest query to the GLM. For instance, in example implementations, the act 850 involves providing the reformulated autosuggest query to the generative language model for display in a second user interface separate from the first user interface.

In one or more implementations, the act 850 includes providing the autosuggest query to the generative language model for display in a second user interface separate from the first user interface in response to detecting a selection of the generative language model element. In some implementations, the act 850 includes providing the reformulated autosuggest query to a generative language model for display in a second user interface separate from the first user interface along with a narrative query result of the reformulated autosuggest query generated by the generative language model.

In some implementations, providing the reformulated autosuggest query to the generative language model causes the generative language model to automatically generate a narrative query response to the reformulated autosuggest query. In various implementations, the act 850 includes causing a new browser tab to open in a browser on a client device of a user that shows the second user interface of the generative language model, where the second user interface includes the reformulated autosuggest query and the narrative query response.

In various implementations, the act 850 includes detecting an additional selection of an additional generative language model element displayed next to an additional autosuggest query for the text input and causing an additional new browser tab to open in the browser on the client device of the user that shows an additional instance of the generative language model that includes the additional autosuggest query and an additional narrative query response responsive to the additional autosuggest query.

In some implementations, the series of acts 800 includes additional acts. For example, the series of acts 800 includes acts of detecting selections of multiple generative language model elements corresponding to multiple autosuggest queries provided in response to the text input, detecting an additional selection of a combined generative language model element, generating the reformulated autosuggest query from the multiple autosuggest queries, and providing the reformulated autosuggest query to the generative language model.

Figure 9:
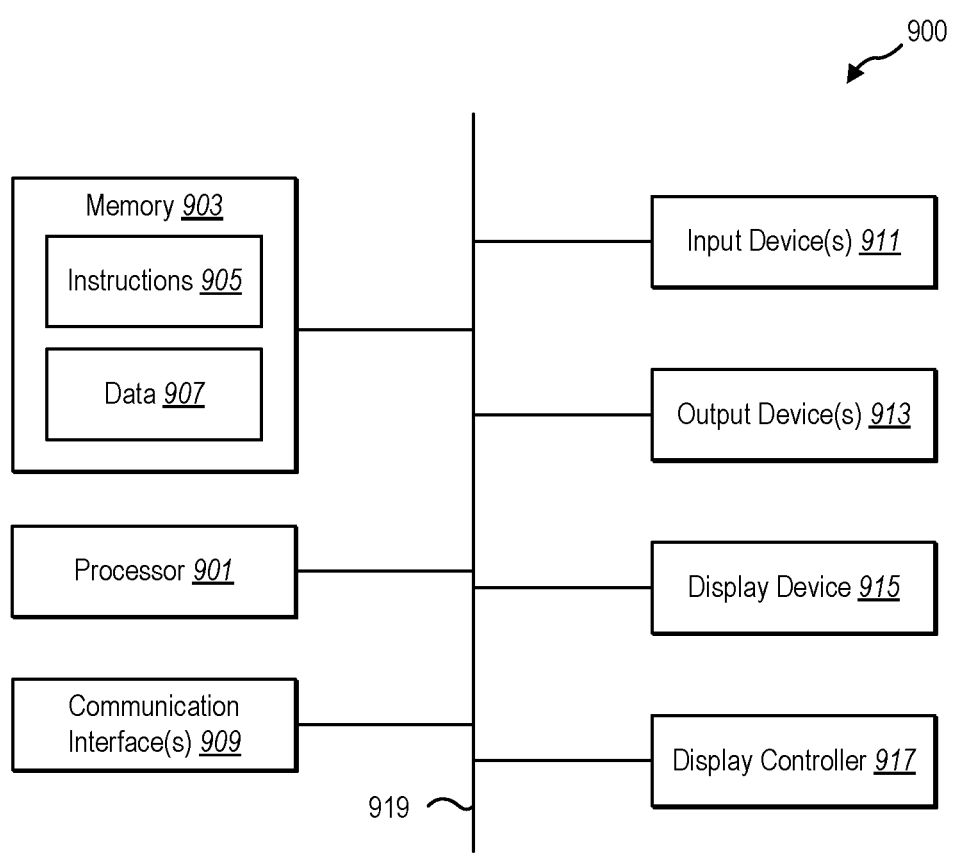
FIG. 9 illustrates components included within an example computer system.

FIG. 9 illustrates certain components that may be included within a computer system 900. The computer system 900 may be used to implement the various computing devices, components, and systems described herein (e.g., by performing computer-implemented instructions). As used herein, a "computing device" refers to electronic components that perform a set of operations based on a set of programmed instructions. Computing devices include groups of electronic components, client devices, server devices, etc.

In various implementations, the computer system 900 represents one or more of the client devices, server devices, or other computing devices described above. For example, the computer system 900 may refer to various types of network devices capable of accessing data on a network, a cloud computing system, or another system. For instance, a client device may refer to a mobile device such as a mobile telephone, a smartphone, a personal digital assistant (PDA), a tablet, a laptop, or a wearable computing device (e.g., a headset or smartwatch). A client device may also refer to a non-mobile device such as a desktop computer, a server node (e.g., from another cloud computing system), or another non-portable device.

The computer system 900 includes a processing system including a processor 901. The processor 901 may be a general-purpose single- or multi-chip microprocessor (e.g., an Advanced Reduced Instruction Set Computer (RISC) Machine (ARM)), a special-purpose microprocessor (e.g., a digital signal processor (DSP)), a microcontroller, a programmable gate array, etc. The processor 901 may be referred to as a central processing unit (CPU) and may cause computer-implemented instructions to be performed. Although the processor 901 shown is just a single processor in the computer system 900 of FIG. 9, in an alternative configuration, a combination of processors (e.g., an ARM and DSP) could be used.

The computer system 900 also includes memory 903 in electronic communication with the processor 901. The memory 903 may be any electronic component capable of storing electronic information. For example, the memory 903 may be embodied as random-access memory (RAM), read-only memory (ROM), magnetic disk storage media, optical storage media, flash memory devices in RAM, on-board memory included with the processor, erasable programmable read-only memory (EPROM), electrically erasable programmable read-only memory (EEPROM), registers, and so forth, including combinations thereof.

The instructions 905 and the data 907 may be stored in the memory 903. The instructions 905 may be executable by the processor 901 to implement some or all of the functionality disclosed herein. Executing the instructions 905 may involve the use of the data 907 that is stored in the memory 903. Any of the various examples of modules and components described herein may be implemented, partially or wholly, as instructions 905 stored in memory 903 and executed by the processor 901. Any of the various examples of data described herein may be among the data 907 that is stored in memory 903 and used during the execution of the instructions 905 by the processor 901.

A computer system 900 may also include one or more communication interface(s) 909 for communicating with other electronic devices. The one or more communication interface(s) 909 may be based on wired communication technology, wireless communication technology, or both. Some examples of the one or more communication interface(s) 909 include a Universal Serial Bus (USB), an Ethernet adapter, a wireless adapter that operates according to an Institute of Electrical and Electronics Engineers (IEEE) 902.11 wireless communication protocol, a Bluetooth® wireless communication adapter, and an infrared (IR) communication port.

A computer system 900 may also include one or more input device(s) 911 and one or more output device(s) 913. Some examples of the one or more input device(s) 911 include a keyboard, mouse, microphone, remote control device, button, joystick, trackball, touchpad, and light pen. Some examples of the one or more output device(s) 913 include a speaker and a printer. A specific type of output device that is typically included in a computer system 900 is a display device 915. The display device 915 used with implementations disclosed herein may utilize any suitable image projection technology, such as liquid crystal display (LCD), light-emitting diode (LED), gas plasma, electroluminescence, or the like. A display controller 917 may also be provided, for converting data 907 stored in the memory 903 into text, graphics, and/or moving images (as appropriate) shown on the display device 915.

The various components of the computer system 900 may be coupled together by one or more buses, which may include a power bus, a control signal bus, a status signal bus, a data bus, etc. For clarity, the various buses are illustrated in FIG. 9 as a bus system 919.

This disclosure describes a query gateway system in the framework of a network. In this disclosure, a "network" refers to one or more data links that enable electronic data transport between computer systems, modules, and other electronic devices. A network may include public networks such as the Internet as well as private networks. When information is transferred or provided over a network or another communication connection (either hardwired, wireless, or both), the computer correctly views the connection as a transmission medium. Transmission media can include a network and/or data links that carry required program code in the form of computer-executable instructions or data structures, which can be accessed by a general-purpose or special-purpose computer.

In addition, the network described herein may represent a network or a combination of networks (such as the Internet, a corporate intranet, a virtual private network (VPN), a local area network (LAN), a wireless local area network (WLAN), a cellular network, a wide area network (WAN), a metropolitan area network (MAN), or a combination of two or more such networks) over which one or more computing devices may access the various systems described in this disclosure. Indeed, the networks described herein may include one or multiple networks that use one or more communication platforms or technologies for transmitting data. For example, a network may include the Internet or other data link that enables transporting electronic data between respective client devices and components (e.g., server devices and/or virtual machines thereon) of the cloud computing system.

Further, upon reaching various computer system components, program code means in the form of computer-executable instructions or data structures can be transferred automatically from transmission media to non-transitory computer-readable storage media (devices), or vice versa. For example, computer-executable instructions or data structures received over a network or data link can be buffered in random-access memory (RAM) within a network interface module (NIC), and then it is eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions include instructions and data that, when executed by a processor, cause a general-purpose computer, special-purpose computer, or special-purpose processing device to perform a certain function or group of functions. In some implementations, computer-executable and/or computer-implemented instructions are executed by a general-purpose computer to turn the general-purpose computer into a special-purpose computer implementing elements of the disclosure. The computer-executable instructions may include, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or a combination of hardwired and wireless data links) through a network, both perform tasks. In a distributed system environment, program modules may be located in both local and remote memory storage devices.

The techniques described herein may be implemented in hardware, software, firmware, or any combination thereof unless specifically described as being implemented in a specific manner. Any features described as modules, components, or the like may also be implemented together in an integrated logic device or separately as discrete but interoperable logic devices. If implemented in software, the techniques may be realized at least in part by a non-transitory processor-readable storage medium, including instructions that, when executed by at least one processor, perform one or more of the methods described herein (including computer-implemented methods). The instructions may be organized into routines, programs, objects, components, data structures, etc., which may perform particular tasks and/or implement particular data types, and which may be combined or distributed as desired in various implementations.

Computer-readable media can be any available media that can be accessed by a general-purpose or special-purpose computer system. Computer-readable media that store computer-executable instructions are non-transitory computer-readable storage media (devices). Computer-readable media that carry computer-executable instructions are transmission media. Thus, by way of example, implementations of the disclosure can include at least two distinctly different kinds of computer-readable media: non-transitory computer-readable storage media (devices) and transmission media.

As used herein, non-transitory computer-readable storage media (devices) may include RAM, ROM, EEPROM, CD-ROM, solid-state drives (SSDs) (e.g., based on RAM), Flash memory, phase-change memory (PCM), other types of memory, other optical disk storage, magnetic disk storage or other magnetic storage devices, or any other medium which can be used to store desired program code means in the form of computer-executable instructions or data structures and which can be accessed by a general-purpose or special-purpose computer.

The steps and/or actions of the methods described herein may be interchanged with one another without departing from the scope of the claims. In other words, unless a specific order of steps or actions is required for the proper operation of the method that is being described, the order and/or use of specific steps and/or actions may be modified without departing from the scope of the claims.

The term "determining" encompasses a wide variety of actions and, therefore, "determining" can include calculating, computing, processing, deriving, investigating, looking up (e.g., looking up in a table, a data repository, or another data structure), ascertaining, and the like. Also, "determining" can include receiving (e.g., receiving information), accessing (e.g., accessing data in a memory), and the like. Also, "determining" can include resolving, selecting, choosing, establishing, and the like.

The terms "comprising," "including," and "having" are intended to be inclusive and mean that there may be additional elements other than the listed elements. Additionally, it should be understood that references to "one implementation" or "implementations" of the present disclosure are not intended to be interpreted as excluding the existence of additional implementations that also incorporate the recited features. For example, any element or feature described concerning an implementation herein may be combinable with any element or feature of any other implementation described herein, where compatible.

The present disclosure may be embodied in other specific forms without departing from its spirit or characteristics. The described implementations are to be considered illustrative and not restrictive. The scope of the disclosure is indicated by the appended claims rather than by the foregoing description. Changes that come within the meaning and range of equivalency of the claims are to be embraced within their scope.

What is claimed is:

1. A computer-implemented method for generating narrative query responses utilizing generative language models, comprising:
    generating a generative language model eligibility cache of autosuggest queries;
    in response to receiving text input corresponding to a search query, determining an autosuggest query from a set of autosuggest queries;
    based on determining that the autosuggest query is eligible for a generative language model using the generative language model eligibility cache, providing a generative language model element for display next to the autosuggest query within a first user interface;
    in response to detecting a selection of the generative language model element, generating a reformulated autosuggest query from the autosuggest query; and
    providing the reformulated autosuggest query to the generative language model for display in a second user interface separate from the first user interface.

2. The computer-implemented method of claim 1, further comprising generating the generative language model eligibility cache of autosuggest queries based on query logs of previous text inputs and a classifier model.

3. The computer-implemented method of claim 1, further comprising determining that the autosuggest query is eligible for the generative language model by identifying the autosuggest query in the generative language model eligibility cache.

4. The computer-implemented method of claim 1, further comprising:
    determining that an additional autosuggest query is not eligible for the generative language model; and
    based on the additional autosuggest query not being eligible for the generative language model, determining to not provide any generative language model element for display next to the additional autosuggest query within the first user interface.

5. The computer-implemented method of claim 1, further comprising displaying the generative language model element with the autosuggest query in an autosuggest user interface pane, wherein the autosuggest user interface pane includes a second autosuggest query displayed with a second generative language model element and a third autosuggest query displayed without any generative language model element.

6. The computer-implemented method of claim 1, further comprising generating the reformulated autosuggest query from the autosuggest query by:
    determining that the autosuggest query is in a reformulated query cache; and identifying the reformulated autosuggest query in the reformulated query cache associated with the autosuggest query.

7. The computer-implemented method of claim 6, further comprising generating reformulated autosuggest queries for the reformulated query cache from previous autosuggest queries utilizing a sequence-to-sequence machine-learning model.

8. The computer-implemented method of claim 1, further comprising generating the reformulated autosuggest query from the autosuggest query by:
  determining that the autosuggest query is not in a reformulated query cache;
  utilizing a lightweight language model to determine the reformulated autosuggest query on-the-fly; and
  adding the reformulated autosuggest query to the reformulated query cache for the autosuggest query.

9. The computer-implemented method of claim 1, wherein the reformulated autosuggest query is more verbose than the autosuggest query.

10. The computer-implemented method of claim 1, wherein providing the reformulated autosuggest query to the generative language model causes the generative language model to automatically generate a narrative query response to the reformulated autosuggest query.

11. The computer-implemented method of claim 10, further comprising causing a new browser tab to open in a browser on a client device of a user that shows the second user interface of the generative language model, wherein the second user interface includes the reformulated autosuggest query and the narrative query response.

12. The computer-implemented method of claim 11, further comprising:
  detecting an additional selection of an additional generative language model element displayed next to an additional autosuggest query for the text input; and
  causing an additional new browser tab to open in the browser on the client device of the user that shows an additional instance of the generative language model that includes the additional autosuggest query and an additional narrative query response responsive to the additional autosuggest query.

13. A computer-implemented method for generating narrative query responses utilizing generative language models, comprising:
  receiving, from a client device, text input corresponding to a search query;
  determining an autosuggest query from a set of autosuggest queries stored in an autosuggest query cache based on the text input;
  providing a generative language model element for display next to the autosuggest query within a first user interface;
  in response to detecting a selection of the generative language model element in the first user interface, generating a reformulated autosuggest query from the autosuggest query utilizing a reformulation model having a lightweight language model and a reformulated query cache; and
  providing the reformulated autosuggest query to a generative language model for display in a second user interface separate from the first user interface along with a narrative query result of the reformulated autosuggest query generated by the generative language model.

14. The computer-implemented method of claim 13, further comprising:
  generating a generative language model eligibility cache of autosuggest queries by classifying the autosuggest queries according to the generative language model;
  determining that the autosuggest query is eligible for the generative language model by identifying the autosuggest query in the generative language model eligibility cache; and
  providing the generative language model element for display next to the autosuggest query within the first user interface based on determining that the autosuggest query is eligible for the generative language model.

15. The computer-implemented method of claim 13, further comprising:
  detecting selections of multiple generative language model elements corresponding to multiple autosuggest queries provided in response to the text input;
  detecting an additional selection of a combined generative language model element;
  generating the reformulated autosuggest query from the multiple autosuggest queries; and
  providing the reformulated autosuggest query to the generative language model.

16. The computer-implemented method of claim 13, further comprising generating the reformulated autosuggest query from the autosuggest query by:
  determining that the autosuggest query is in the reformulated query cache; and
  identifying the reformulated autosuggest query in the reformulated query cache associated with the autosuggest query.

17. The computer-implemented method of claim 16, further comprising generating reformulated autosuggest queries for the reformulated query cache from previous autosuggest queries utilizing a sequence-to-sequence machine-learning model.

18. The computer-implemented method of claim 13, further comprising generating the reformulated autosuggest query from the autosuggest query by:
  determining that the autosuggest query is not in the reformulated query cache;
  utilizing the lightweight language model to determine the reformulated autosuggest query on-the-fly; and
  adding the reformulated autosuggest query to the reformulated query cache for the autosuggest query.

19. A system for generating narrative query responses utilizing generative language models, comprising:
  a processor; and
  a computer memory comprising instructions that, when executed by the processor, cause the system to perform operations comprising:
    generating a generative language model eligibility cache of autosuggest queries by classifying the autosuggest queries according to a generative language model;
    in response to receiving text input corresponding to a search query, determining an autosuggest query from a set of autosuggest queries;
    based on determining that the autosuggest query is eligible using the generative language model eligibility cache, providing a generative language model element for display next to the autosuggest query within a first user interface; and
    in response to detecting a selection of the generative language model element, providing the autosuggest query to the generative language model for display in a second user interface separate from the first user interface.

20. The system of claim 19, further comprising instructions that, when executed by the processor, cause the system to perform operations comprising:

generating, in response to detecting the selection of the generative language model element in the first user interface, a reformulated autosuggest query from the autosuggest query utilizing a reformulation model; and providing the reformulated autosuggest query as the autosuggest query to the generative language model.

* * * * *